(12) United States Patent
Hunt et al.

(10) Patent No.: US 7,600,232 B2
(45) Date of Patent: Oct. 6, 2009

(54) INTER-PROCESS COMMUNICATIONS EMPLOYING BI-DIRECTIONAL MESSAGE CONDUITS

(75) Inventors: Galen C. Hunt, Bellevue, WA (US); James R. Larus, Mercer Island, WA (US); Manuel Fahndrich, Seattle, WA (US); Edward P. Wobber, Menlo Park, CA (US); Martin Abadi, Palo Alto, CA (US); John D. DeTreville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 11/007,655

(22) Filed: Dec. 7, 2004

(65) Prior Publication Data

US 2006/0123424 A1    Jun. 8, 2006

(51) Int. Cl.
G06F 3/00 (2006.01)
G06F 9/44 (2006.01)
G06F 9/46 (2006.01)
G06F 13/00 (2006.01)

(52) U.S. Cl. ..................... 719/313; 719/330
(58) Field of Classification Search ......... 719/312–317, 719/328, 330
See application file for complete search history.

(56) References Cited

U.S. PATENT DOCUMENTS

| | | | |
|---|---|---|---|
| 4,916,637 A | 4/1990 | Allen et al. | |
| 5,455,951 A * | 10/1995 | Bolton et al. | 718/103 |
| 5,469,571 A | 11/1995 | Bunnell | |
| 5,481,717 A | 1/1996 | Gaboury | |
| 5,551,051 A | 8/1996 | Silverthorn et al. | |
| 5,590,001 A | 12/1996 | Ino et al. | |
| 5,752,032 A | 5/1998 | Keller et al. | |
| 5,768,532 A | 6/1998 | Megerian | |
| 5,794,052 A | 8/1998 | Harding | |
| 5,857,195 A | 1/1999 | Hayashi et al. | |
| 5,878,408 A | 3/1999 | Van Huben et al. | |
| 5,938,723 A | 8/1999 | Hales, II et al. | |
| 5,963,743 A | 10/1999 | Amberg et al. | |
| 5,974,572 A | 10/1999 | Weinberg et al. | |
| 5,991,518 A | 11/1999 | Jardine et al. | |
| 6,009,476 A | 12/1999 | Flory et al. | |

(Continued)

FOREIGN PATENT DOCUMENTS

EP    1033648 (A2)    9/2000

(Continued)

OTHER PUBLICATIONS

Pike, et al., "Plan 9 from Bell Labs".

(Continued)

*Primary Examiner*—Hyung S Sough
*Assistant Examiner*—Qing-Yuan Wu
(74) *Attorney, Agent, or Firm*—Lee & Hayes, PLLC (57) ABSTRACT

Described herein is an implementation of an inter-process communications technology. One or more implementations, described herein, facilitate creation of a bi-directional message conduit having exactly two endpoints. A first endpoint is owned by a first software process and a second endpoint is owned by a second software process. One or more implementations, described herein, maintain the bi-directional message conduit for passing multiple messages via the bi-directional message conduit from the first process to the second process, according to established rules that can be checked.

40 Claims, 4 Drawing Sheets

U.S. PATENT DOCUMENTS

| | | | |
|---|---|---|---|
| 6,038,399 | A | 3/2000 | Fisher et al. |
| 6,066,182 | A | 5/2000 | Wilde et al. |
| 6,072,953 | A | 6/2000 | Cohen et al. |
| 6,080,207 | A | 6/2000 | Kroening et al. |
| 6,092,189 | A | 7/2000 | Fisher et al. |
| 6,144,992 | A | 11/2000 | Turpin et al. |
| 6,157,928 | A | 12/2000 | Sprenger et al. |
| 6,161,051 | A | 12/2000 | Hafemann et al. |
| 6,182,275 | B1 | 1/2001 | Beelitz et al. |
| 6,247,128 | B1 | 6/2001 | Fisher et al. |
| 6,292,941 | B1 | 9/2001 | Jollands |
| 6,351,850 | B1 | 2/2002 | van Gilluwe et al. |
| 6,381,742 | B2 | 4/2002 | Forbes et al. |
| 6,405,361 | B1 | 6/2002 | Broy et al. |
| 6,434,694 | B1 | 8/2002 | Slaughter et al. |
| 6,442,754 | B1 | 8/2002 | Curtis |
| 6,446,260 | B1 | 9/2002 | Wilde et al. |
| 6,487,723 | B1 | 11/2002 | MacInnis |
| 6,658,447 | B2 | 12/2003 | Cota-Robles |
| 6,816,905 | B1 | 11/2004 | Sheets et al. |
| 6,842,782 | B1 | 1/2005 | Malik et al. |
| 6,868,539 | B1 | 3/2005 | Travison et al. |
| 6,912,692 | B1 | 6/2005 | Pappas |
| 6,977,994 | B2 * | 12/2005 | Stephenson et al. ...... 379/93.01 |
| 6,988,261 | B2 | 1/2006 | Sokolov et al. |
| 7,062,764 | B2 | 6/2006 | Cohen et al. |
| 7,086,056 | B2 | 8/2006 | Fukushima |
| 7,155,713 | B1 | 12/2006 | Burkhardt et al. |
| 7,167,867 | B1 | 1/2007 | Rago |
| 7,222,106 | B2 | 5/2007 | Block et al. |
| 7,222,341 | B2 | 5/2007 | Forbes et al. |
| 7,484,245 | B1 | 1/2009 | Friedman et al. |
| 2001/0029605 | A1 | 10/2001 | Forbes |
| 2002/0099954 | A1 | 7/2002 | Kedma et al. |
| 2002/0100017 | A1 | 7/2002 | Grier et al. |
| 2003/0031404 | A1 | 2/2003 | Pedersen |
| 2003/0061404 | A1 | 3/2003 | Atwal et al. |
| 2003/0130854 | A1 | 7/2003 | Galanes et al. |
| 2003/0212990 | A1 | 11/2003 | Brodkorb et al. |
| 2003/0233644 | A1 | 12/2003 | Cohen et al. |
| 2004/0034850 | A1 | 2/2004 | Burkhardt et al. |
| 2004/0061067 | A1 | 4/2004 | Clauss |
| 2004/0064736 | A1 | 4/2004 | Obrecht et al. |
| 2004/0123273 | A1 | 6/2004 | Hammerich et al. |
| 2004/0187096 | A1 | 9/2004 | Dumont |
| 2004/0199763 | A1 | 10/2004 | Freund |
| 2004/0236861 | A1 | 11/2004 | Bondar et al. |
| 2005/0005261 | A1 | 1/2005 | Severin |
| 2005/0021537 | A1 | 1/2005 | Brendle et al. |
| 2005/0050069 | A1 | 3/2005 | Vaschillo et al. |
| 2005/0060687 | A1 | 3/2005 | Ghazaleh et al. |
| 2005/0091658 | A1 | 4/2005 | Kavalam et al. |
| 2006/0031815 | A1 | 2/2006 | Bhagia et al. |
| 2007/0256080 | A1 * | 11/2007 | Smith et al. ................. 719/313 |

FOREIGN PATENT DOCUMENTS

| | | |
|---|---|---|
| EP | 1443398 A | 8/2004 |
| KR | 20010007119 | 1/2001 |
| WO | WO02093370 A | 11/2002 |
| WO | WO03038599 A2 | 5/2003 |

OTHER PUBLICATIONS

Pike, et al, "The Use of Name Spaces in Plan 9", Operating Systems Review, vol. 27, #2, Apr. 1993, pp. 72-76.

Watson, et al., "Design and implementation of the Trusted BSD MAC framework", Proceedings of 2003 DARPA Information Survivability Conference and Exposition, Sec. 1&5-7, Apr. 2003, pp. 38-49.

"Trademark Electronic Search System (TESS) from the USPTO database" for "Windows" trademark of Microsoft filed in USPTO Aug. 20, 1999; http://tess2.uspto.gov/bin/gate.exe? f=doc &state=n00gan.5.26.

Microsoft Press Computer Dictionary, Second Edition, 1994, Published by Penguin Books, Ltd., pp. 23-24 and p. 279.

Microsoft Press Computer Dictionary Third Edition: 1997 3 pages.

"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.

Bogojevic, et al., "The Architecture of Massive Multiplayer Online Games", retrieved on Feb. 25, 2009 at <<http://graphics.cs.lth.se/theses/projects/mmogarch/som.pdf>>, Department of Computer Science, Lund University, Sep. 8, 2003, Chapter 4, 11 pages.

Hunt et al: "Broad New OS Research: Challenges and Opportunities" Retrieved from the Internet: URL: http://research.microsoft.com/os/singularity/publications/hotos2005_broadnewreseach.pdf> [retrieved on Dec. 2, 2008].

Mikunov A., "Rewrite MSil Code on the Fly with the .NET Framework Profiling API", MSDN Magazine (Online) Sep. 2003, Retrieved from the Internet: URL: <<http://msdn.microsoft.com/en-us/magazine/cc188743(printer).aspx>> retrieved onDec. 12, 2008).

Tatsubori et al: "Open Java: a Class-Based Macro System for Java" 2000 [Retrieved from the Internet: URL: http://www.springerlink.com/content/n64gdultayqfmcjc/fulltext.pdf> [retrieved on Dec. 2, 2008].

* cited by examiner

INTER-PROCESS COMMUNICATIONS EMPLOYING BI-DIRECTIONAL MESSAGE CONDUITS

TECHNICAL FIELD

This invention generally relates to a technology for inter-process communications that, for example, enables static analysis and detection of common programmer errors related to inter-process communication.

BACKGROUND

Operating systems typically partition computation into a kernel and a number of user-level or kernel-level software processes (or simply "processes"). In addition to many other functions, operating systems typically operate in the role of process manager. Under management of an operating system (OS), a process can have a finite lifetime and the execution of threads within a process can be bounded by that finite lifetime. In addition, operating systems typically provide mechanisms for enforcing isolation between processes. For example, most modern operating systems use virtual memory management hardware built into the processor to create a protected address space or protection domain for each process. To varying degrees, processes are isolated from each other because the operating system restricts their access to state or information inside other processes.

Lifetime management and state isolation of process is designed to allow a computer to perform concurrent operations (in the form of processes) while allowing developers to bound the complexity of a computation as a whole. The idea is that a programmer usually need be concerned only with the computation occurring within a single process—the one containing the programmer's program—because computations outside the process can have only limited effect on the process at hand. In the best case, the programmer can write a program for a single process' computation without concern for computation occurring in other processes, because they cannot affect the first process.

Unfortunately, a computer system typically includes many application programs that by their nature work together, so that the system's computation necessarily includes the interaction of multiple processes. For example, in a common configuration, the Microsoft® Office Outlook® communications and information management program uses at least two processes. One process is for composing individual email messages and another process is for displaying email folders, calendaring information, and the main graphical user interface (GUI). In another example, an operating system may use one process to manage the GUI desktop and other processes to manage logon requests or access to encrypted password-protected data. In many more instances, processes must share certain resources, such as the file store, or communicate with shared services, humans, etc.

Inter-Process Communication

The segregation of computation into distinct processes is helpful for structuring computational components. However, processes typically cannot be completely isolated, and this fact creates a need for communication mechanisms that allow processes to communicate with each other and with the components of the operating system, including the kernel itself. Collectively, these communication mechanisms are typically known by the term Inter-Process Communication (IPC).

Properly employing an IPC mechanism, multiple processes can with some degree of effort be programmed to share common data, but still without interfering with one another. IPC mechanisms may be grouped into two classes: shared-state mechanisms and message-passing mechanisms. Shared-state mechanisms include, but are not limited to, shared-memory and shared-synchronization mechanisms (like shared locks or semaphores). Message-passing mechanisms include, but are not limited to, the following: message queues, remote procedure calls (RPCs), local remote procedure calls (LRPCs), sockets, and named pipes. These IPC mechanisms are well known to those of ordinary skill in the art.

IPC mechanisms enable communication between processes while providing a framework for programmers to control the interaction between the computations occurring in separate processes. IPC mechanisms restrict the possible interactions so that programmers can consider fewer cases, or think about interactions more generally or more abstractly. These restrictions aid in the construction of correct, reliable software.

While conventional IPC approaches provide mechanisms to facilitate inter-process communication, they provide little (or no) structure to help programmers address or avoid possible problems associated with such communication. There is little (or no) assistance that helps ensure correct communication between processes without interfering with each other.

For example, when using shared-memory mechanisms, even a slight program error or a slight programmer misunderstanding can result in the contents of the shared memory being rendered incomprehensible by either process attempting to share the memory. While conventional OS message-passing mechanisms reduce the chance of actual state corruption between processes, they do nothing to prevent one process from presenting messages to another in an unexpected order or with unexpected contents, indirectly causing such corruption.

Errors involving miscommunication or unanticipated interactions between processes are common with conventional unstructured IPC approaches. Indeed, these types of errors occur frequently and are extremely expensive to detect, to understand, and to fix. They typically require time-consuming testing and debugging to detect their existence and extent, and find their cause and time-consuming development efforts to correct errors related to miscommunication or unanticipated interactions.

SUMMARY

Described herein is an implementation of an inter-process communications technology. One or more implementations, described herein, facilitate creation of a bi-directional message conduit having exactly two endpoints. A first endpoint is owned by a first software process and a second endpoint is owned by a second software process. One or more implementations, described herein, maintain the bi-directional message conduit for passing multiple messages via the bi-directional message conduit from the first process to the second process, according to established rules that can be checked.

BRIEF DESCRIPTION OF THE DRAWINGS

The same numbers are used throughout the drawings to reference like elements and features.

DETAILED DESCRIPTION

The following description sets forth techniques implementing an Inter-Process Communication (IPC) technology that employs a bi-directional message conduit having exactly two endpoints. An exemplary implementation of these techniques may be referred to as an "exemplary inter-process communication."

The exemplary inter-process communication provides a refreshing and invigorating approach to the realm of computer science (and operating systems in particular) for IPC. This new approach provides an IPC architecture that prevents or facilitates the detection of errors related to miscommunication or unanticipated interactions between processes. In addition to errors, this new architecture may detect actions (possibly malicious actions) that do not promote healthy interprocess interactions. Consequently, the software processes using this new IPC architecture are now more capable of being secure, stable, robust, deterministic, etc.

The IPC architecture provides for communication between processes and communication between processes and an operating system's kernel. This new architecture offers less complexity to the programmer than do conventional IPC approaches. By decreasing the complexity of IPC, the architecture reduces the programmer effort required to create, understand, and maintain programs that incorporate IPC and reduces the occurrence of programmer errors in programs incorporating IPC, as well as allowing the construction of larger and/or more complex software systems.

The IPC architecture also increases the ability of static analysis tools to help programmers find and correct IPC errors without time-consuming testing and debugging. By increasing the effectiveness and applicability of deterministic static pre-computation analysis tools, the new IPC architecture further increases the likelihood that a programmer or set of programmers will produce a program or set of programs that are free of IPC-related errors, and further reduces the testing and debugging effort required to produce such a program or set of programs.

Exemplary IPC Architecture

Figure 1:
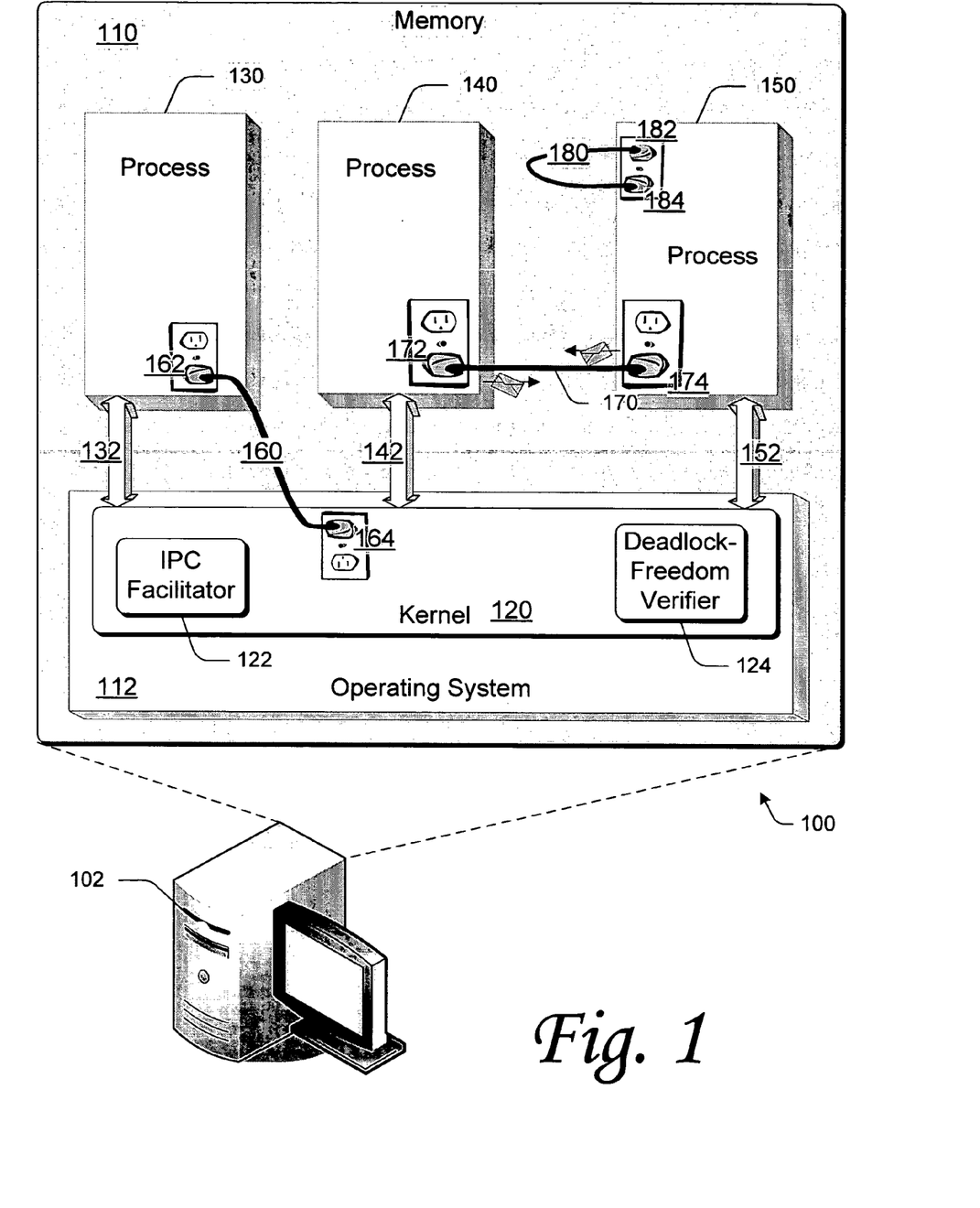
FIG. 1 shows an example operating scenario for an implementation described herein.

FIG. 1 illustrates one exemplary IPC architecture 100 that is designed to prevent errors related to miscommunication or unanticipated interactions between processes. The architecture 100 is implemented on a computer 102, which is configured with a memory 110 (e.g., volatile, non-volatile, removable, non-removable, etc.). An operating system (OS) 112 is shown stored in the memory 110 and is executed on the computer 102.

OS 112 has a kernel 120. The OS kernel 120 incorporates an Inter-Process Communication (IPC) facilitator 122 and a deadlock-freedom verifier 124. The OS kernel 120 may construct one or more processes. FIG. 1 shows, for example, three active process (130, 140, and 150) running in memory 110.

The IPC facilitator 122 facilitates communications between active processes (such as processes 130, 140, and 150). The deadlock-freedom verifier 124 verifies that no deadlock exists amongst a network of interconnected processes. An example of a "deadlock" situation is when two or more processes are each waiting for the other or another to respond before proceeding, in such a way that they can never resolve the deadlock.

While FIG. 1 illustrates the OS kernel 120 implementing the IPC facilitator 122 and the deadlock-freedom verifier 124, other implementations may have the IPC facilitator and the verifier that are external to the OS kernel. If so, each would work in cooperation and/or coordination with the OS.

The IPC architecture 100 structures communication to and/or from processes into two mechanisms:

Primitive Operations are exclusively for processes (such as processes 130, 140, and 150) to communicate with the OS kernel 120. Primitive Operations are used to expose a basic set of minimal kernel services to a process.

Channels are for processes (such as processes 130, 140, and 150) to communicate with either the OS kernel 120 or other processes. Channels are used to exchange state or information, in the format of messages, between communicating processes or between a process and higher-level kernel services. Channels may also be called "bidirectional message conduits."

Primitive Operations

In the IPC architecture 100, all OS operations which manipulate only the state of computation within a process are exposed exclusively through a primitive operation.

FIG. 1 metaphorically illustrates primitive operation connections as three-dimensional double-headed arrows. Primitive connection 132 links process 130 and OS kernel 120. Primitive connection 142 links process 140 and OS kernel 120. Primitive connection 152 links process 150 and OS kernel 120. A process may have multiple primitive operation links, but they all connect to the OS kernel.

In the IPC architecture 100, the primitive operations include (by way of example and not limitation) the operations to create or destroy threads within a process, to create and destroy thread synchronization objects—such as locks or semaphores—within a process, to synchronize threads on synchronization objects within a process, to create a channel, to send or receive a message on a channel, and to synchronize threads on message receipt within a process.

Message-send and message-receive operations on a channel are primitive operations because they semantically alter the state of only a single process. The message-send primitive has the semantic of removing a message and the message's accessible components from the accessible state of the sending process and placing them in the channel. The message-receive primitive has the semantic of removing a message and the message's accessible components from the channel and adding them to the accessible state of the receiving process. In a preferred embodiment, message-send and message-receive operations are the only form of synchronization operations allowed between processes. With the exception of message-send and message-receive operations, thread synchronization objects available within processes cannot be used to synchronize threads executing in differing processes.

In the IPC architecture 100, the primitive operation is implemented using a protected call, such as a trap operation. The protected call may be protected using either hardware protection mechanisms, like the software interrupt mechanism on the Intel® Pentium® microprocessors, or software protection mechanisms, like type safety to statically or dynamically limit access to the target code and data of the protected call. In the IPC architecture 100, the number of primitive operations in any operating system may be fixed, with all system extensions implemented using channels.

Channels

While a primitive operation may be limited to affecting only the state of the process that invokes the operation, channels provide a mechanism to affect the state of other processes by passing messages that cause a receiving process to perform some action.

With the IPC architecture 100, a channel is a bi-directional message conduit having exactly two distinguished channel endpoints (or simply "endpoints"). Each endpoint is at any point in time owned by, at most, one process. A channel is configured for passing multiple messages between the channel's endpoints. In addition, in a preferred embodiment channel communication is asynchronous.

FIG. 1 metaphorically illustrates channels as electrical plugs, cords, and outlets. Channels have exactly and only two endpoints and each endpoint is owed by, at most, one process. Channel 160 links process 130 and OS kernel 120 and has only two endpoints 162 and 164. Channel 170 links process 140 and process 150 and has only two endpoints 172 and 174. Channel 180 is a newly formed channel that initially links process 150 to itself, but still only has two endpoints 182 and 184.

These channels are represented by a graphic metaphor of an "electrical cord" with exactly two "plugs" (representing the endpoints). Rather than conducting electricity, these "cords" conduct messages being sent and received by each participant ("bi-directionally") where the "cord" is plugged in. This bi-directional message passing is illustrated by the directional envelopes next to channel 170.

The IPC architecture 100 offers a message-passing IPC communication mechanism. Instead of using timely writing and reading of some shared memory (as in some of the conventional approaches), IPC architecture 100 limits inter-process communications to sending and receiving of messages.

Conventional OS message-passing approaches are one-way Mechanisms—often with either one sender and multiple recipients or multiple senders and a one recipient. Unlike those conventional approaches, the channels of the IPC architecture 100 are two-way mechanisms with exactly two endpoints and at most two participants.

This is illustrated by channel 160 and channel 170 in FIG. 1. Channel 160 links process 130 and OS kernel 120 and only those two. Channel 170 links process 140 and process 150 and only those two.

As illustrated in FIG. 1, each of the bi-directional IPC channel has exactly two channel endpoints. Each channel endpoint is owned by, at most, one process at a time. For example, one channel endpoint is owned by one process and the other channel endpoint is owed by another process or is owned by the kernel of the operating system.

When conventional state-sharing approaches are available, a message may contain references to other objects that would be external to a receiving process, so that the receiving process would have to share these other objects in order to access them. Since objects are not shared with the IPC architecture 100, the IPC facilitator 122 ensures that messages passed over a channel are fully encapsulated. A fully encapsulated message includes all objects reachable from the message. Therefore, all objects reachable from the message are themselves transferred when the message is sent from one process to another.

The IPC facilitator 122 guarantees that each message and each message's encapsulation are owned by at most one process at any instant. This may be accomplished by employing a channel-level abstraction for each channel. Those of ordinary skill in the art will recognize that such enforcement may be achieved by, for example, treating the message and the message's encapsulation as a linear object and by checking locally (in each process) that ownership transfers are correct.

Alternatively, the objects reachable from messages may be copied from the sending process to the receiving process.

Furthermore, at the abstraction level of channels, a message resides in the accessible memory of, at most, one process at any instant. From the perspective of the communicating processes, the state contained within or accessible from a message is never shared. A message is accessible by the message creator only until it is sent. A message is accessible by the message recipient only after it is received.

This channel-level abstraction may be implemented by one or more queues of messages in a shared or separate region of memory protected by one or more synchronization objects. The queues and synchronization objects, such as a mutex to guard access to the internal contents of the queue and a signal to unblock a receiving thread when a message is ready for receipt, are hidden from the processes behind the channel abstraction. This channel-level abstraction can readily maintain the semantics that effective message ownership changes when a message is sent through a channel, but the implementation may utilize shared memory to accomplish the channel abstraction.

Channel Contracts

With the IPC architecture 100, channels are strongly typed by a "channel contract." The channel contract defines the relationship between the two endpoints of a channel (which are illustrated as electrical plugs/outlets in FIG. 1). Since each endpoint is owned by, at most, one process, the channel contract effectively defines the inter-process relationship (over one channel) of, at most, two processes at any point in time.

The channel contract defines a set of messages that may be sent through the channel and a specification or description of the allowable sequences of message exchange through the channel. Directly derivable from the channel contract is the set of endpoint states and the allowable transitions between those states in terms of messages sent or received. The channel contract definition is sufficiently explicit and constraining that executable code implementing either end of a channel contract may be statically or dynamically checked for conformance to the contract.

The following listing contains an example of a contract for a name server:

```
contract NameServer {
    input message Register(String name,
            Chan.Exp<NamedService:START> NameServiceChannel);
    input message Lookup<C:START>(String name,
            Chan.Exp<C:START> c);
    output message RegisterAck;
    output message RegisterNack;
    output message LookupAck;
    output message LookupNack;
    state START:        one {
        Register? -> REGISTERING;
        Lookup<C:START>? -> LOOKING;
    }
    state REGISTERING: one {
        RegisterAck! -> START;
        RegisterNack! -> START;
    }
    state LOOKING: one {
        LookupAck! -> START;
        LookupNack! -> START;
    }
}
```

By limiting the channel to no more than two participating processes, the state of the channel contract can be tracked on either end of a channel. Furthermore, a channel's two-way message conduit construction increases the ability of deterministic static pre-computational analysis tools to check the validity of a channel contract and to check the conformance of a body of executable code in a process to a particular channel. This is so because all of the communication between two parties related to a particular "conversation" can be made to flow through this single channel.

As stated before, in a preferred embodiment, channel communication is asynchronous. As long as a process abides by the channel contract, the process may send multiple messages through a channel without waiting for the recipient process to receive the messages.

Channel Endpoint Passing

The IPC facilitator 122 facilitates passing, between processes, multiple messages containing data, of course. In addition, one or more of the messages being passed may also contain channel endpoints. In this way, two processes may establish a new channel between them.

To create a new channel between a first and second process, a first process invokes a primitive operation to create a new channel. The first process places one of the new channel's endpoints into a message and sends that message—with the new channel's endpoint—sequentially through one or more other channels that already link the first and second processes. For example, the process 150 in FIG. 1 may pass endpoint 182 to the process 140 because the process 150 already has an established connection with the process 140 via channel 170.

Transferring an endpoint via a message also transfers ownership of the transferred endpoint. As stated before, a channel's endpoint belongs to, at most, one process at any given instant. To move a channel endpoint to another process, the sending process places an endpoint in a message. By sending the message, the sending process gives up all its current rights to use the endpoint and ownership is transferred to the recipient upon message receipt.

Furthermore, when transferring an endpoint via a message, the state of the channel contract for the transferred endpoint's channel must be statically declared by the message. The current state of actions taking place over the channel of the transferred endpoint is statically declared by the channel contract by which the endpoint-transferring message is passed. The restriction ensures that a recipient always knows statically the state of any endpoint it receives. The restriction further enables static analysis tools to deterministically, soundly and/or completely check the conformation of executable code to channel contracts even in the face of channel endpoints moving between processes.

This greatly facilitates the ability of the IPC facilitator 122 to perform deterministic static pre-computation analysis of processes exchanging channel endpoints through messages. In addition to the IPC facilitator 122 performing deterministic static pre-computation analysis, the facilitator may also perform runtime (i.e., dynamic) analysis to further or independently verify that processes do not violate channel contracts.

Process Identification and Endpoint Fixing

A process owning one endpoint of a channel can request identification of the process holding the other endpoint of that channel. The IPC architecture 100 provides a primitive operation to accomplish this. The identity can include the identity of the program running in the process, the parameters that the process was started with, the identity of the operating system kernel, the parameters the operating system kernel was started with, the identity of shared services it has communicated with, the identity of shared data it has accessed, and so on.

A channel endpoint may optionally be fixed to a particular process. Once fixed, a channel endpoint cannot be transferred to another process. Furthermore, the primitive operation used to determine the identity of the process holding the other endpoint of a channel may be configured to yield a valid result only if the other endpoint has been fixed to a process. In this case, if the other endpoint has not been fixed, the attempt to determine the identity will then return an error.

In at least one other embodiment, messages being passed via channels may have identifying information. In this instance, each message received has an indenter associated with it.

Methodological Implementation of Exemplary Inter-Process Communications

Figure 2:
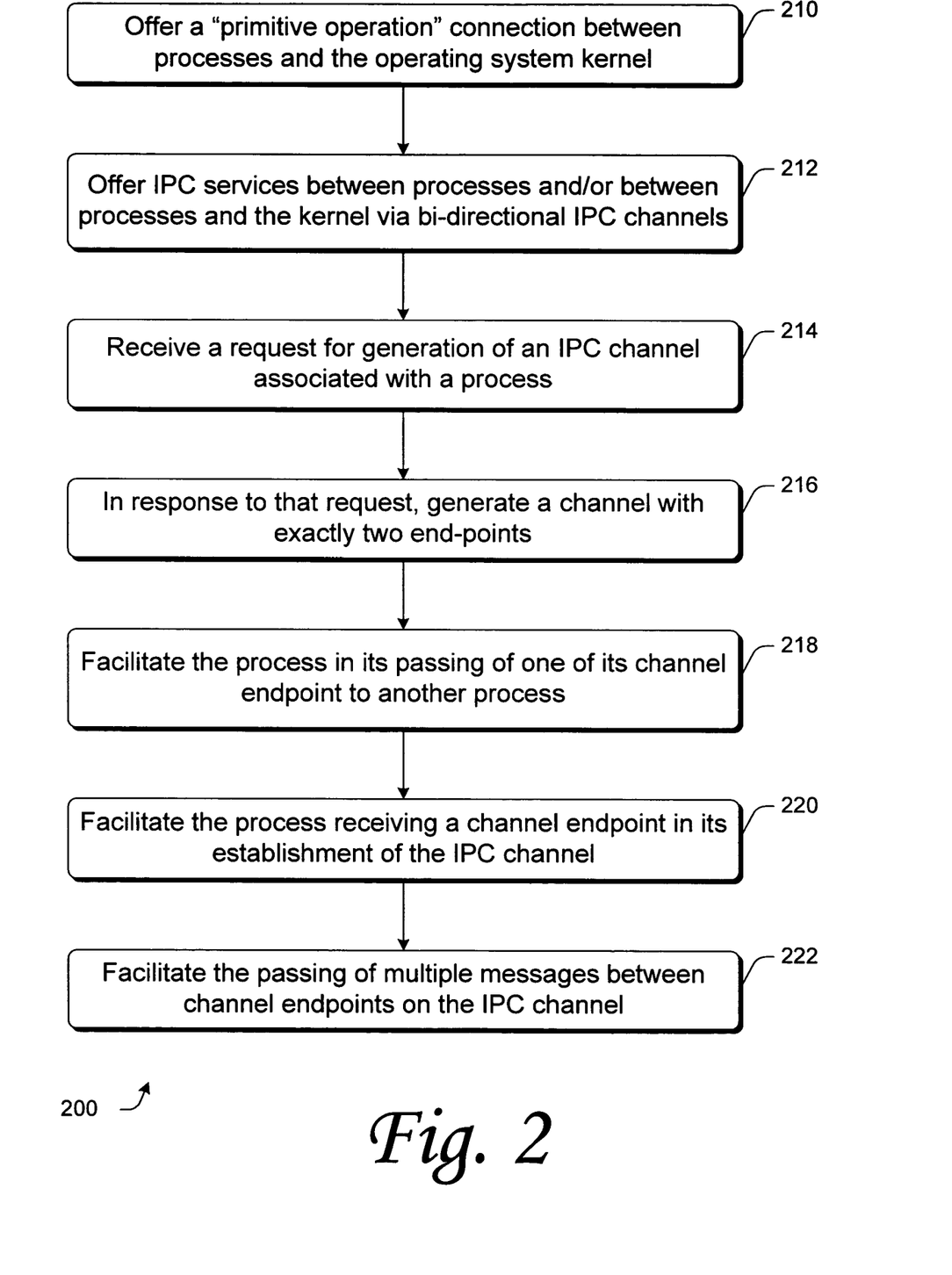
FIG. 2 shows a flow diagram showing a methodological implementation described herein.

FIG. 2 shows a method 200 for interprocess communication performed by the IPC facilitator 122. This methodological implementation may be performed in software, hardware, or a combination thereof. For ease of understanding, the method is delineated as separate steps represented as independent blocks in FIG. 2; however, these separately delineated steps should not be construed as necessarily order dependent in their performance. Additionally, for discussion purposes, the method 200 is described with reference to FIG. 1.

At 210 of FIG. 2, the IPC facilitator 122 offers a "primitive operation" connection (e.g., connection 132 in FIG. 1) between processes and the operating system kernel. The connection exposes primitive operations of the operating system for use by the process. Such an operation being one that only manipulates the state of computation within the process invoking the operation, not the state of computation within any other processes.

At 212, the IPC facilitator 122 offers inter-process communication (IPC) services between processes and/or between processes and higher-level kernel services via bi-directional message conduits (i.e., "channels")

An example of a channel is metaphorically illustrated by channel 170 in FIG. 1. The little envelopes with oppositely directed arrows indicate that the "messages" flow both directions over the channel.

At 214, the IPC facilitator 122 receives a request for generation of an IPC channel associated with a process. More particularly, a process invokes the primitive operation to create a new channel.

At 216, the IPC facilitator 122 generates, in response to the request, a channel with exactly two endpoints, which are called "channel endpoints" herein. As is shown in FIG. 1, the two channel endpoints (182 and 184) of the initially created channel 180 are owned by the same process 150.

Since every process needs at least one channel in order to effectively communicate with other process, the operating system creates each process with at least one channel. So, in addition to being responsive to a request, the IPC facilitator 122 performs the functions of step 216 when a process is created.

At 218, the IPC facilitator 122 facilitates the process in the passing of one of the endpoints of one channel to another process (or to higher-level kernel services).

At 220, the IPC facilitator 122 facilitates the establishment of the channel at the process that received the corresponding endpoint. Subsequent to this operation, for example, the originating process 150 and the receiving process 140) now have a channel linking them together.

At 222, with the channel now established between two processes (or one process and a higher-level kernel service), the IPC facilitator 122 facilitates passing multiple messages between channel endpoints on the established channel.

While conventional message-passing IPC mechanisms typically employ a protocol that includes just a request/command and a response, the IPC facilitator 122 facilitates establishment of channels that allow for more than just one exchange (e.g., one send and one reply). It is important to note that even conventional IPC mechanisms that enable protocols beyond simple request/response do so by obscuring knowledge of the sequences of protocol messages from the IPC mechanism itself. In a sense, the IPC facilitator 122 may be viewed as maintaining the established channel between processes while one process sends multiple messages to the other (and possibly while the other process sends multiple messages to the one process over separate channels).

Furthermore, the established channel may be configured for the messages sent over the established channel to be constrained by a channel contract that defines the relationship between the two channel endpoints of a channel.

Deadlock Freedom

It is possible for a "deadlock" situation to arise during the creation and movement of channels within the realm of the IPC architecture 100.

A "deadlock" is the condition that occurs when two processes are each waiting for the other to respond before proceeding. In other words, a deadlock is the standstill condition that occurs when a first process requires receipt of a particular message from a second process before proceeding further but that particular message will not be forthcoming (often because the second process is likewise waiting on the first). The result of a deadlock is that both processes hang.

An assurance that there are no deadlocks in a network of inter-connected processes is called, herein, "deadlock freedom." As depicted in FIG. 1, the deadlock-freedom verifier 124 analyzes a network of inter-connected processes and provides the assurance that there are no deadlocks in the network.

The deadlock-freedom verifier 124 determines whether a channel-creation or channel-endpoint-transfer action of a process conforms to associated channel contracts. In addition, the verifier forces a cycle-blocking action by at least one identified cycle-dwelling process. This action may also be called "blocking the cycle."

A cycle-dwelling process is one that is part of a deadlock-potential cycle. This cycle is a loop of interconnected processes where there is a potential for deadlock. Although each process conforms to the per channel contracts (as is assured by step 312), a deadlock-potential cycle may arise if every process in a cycle is waiting for a message from others on the cycle before acting.

To prove the absence of this kind of deadlock, the deadlock-freedom verifier 124 guarantees that, for each such cycle that may exist at an instant in the communication network, there is at least one cycle-dwelling process that is not waiting. When the verifier detects the formation of a deadlock-potential cycle, it assigns at least one cycle-dwelling process to "block the cycle." That identified cycle-dwelling process obstructs the cycle by acting during a deadlock situation without waiting for its proscribed message.

Since these communication networks are built dynamically, cycles cannot be ruled out a priori. In particular, when a channel is created, there is apparently a cycle present involving the new channel and the creating process itself. The cycles are tracked statically and in a local fashion allowing for each process to be verified in isolation and yet guaranteeing the deadlock freedom when such processes are composed arbitrarily.

The deadlock-freedom verifier 124 performs a static verification that associates a cycle-blocking obstruction with each cycle that could possibly exist at runtime. An obstruction is a "triple" involving a process (p) and two channel endpoints (a and b). The triple represents two edges on the possible dynamic cycle, namely (a,p) and (p,b). A process with such an obstruction cannot perform a blocking operation on the endpoints "a" or "b" involved in the obstruction.

Obstructions are not forgotten by a process. They can only be changed or eliminated in at least one of two ways with deadlock-freedom verifier 124. The obstructions can be eliminated by a process via the creation of a new process and the transfer of ownership of one of the two endpoints in the obstruction to the new process. This operation eliminates the obstruction if no other obstructions are split between the old and new process. Obstructions can also change as a result of sending/receiving obstructed endpoints. Given the obstruction (a,p,b), if p sends "a" over another endpoint "c", then one of two cases happen. Either the obstruction is remembered by process "p", in which case the obstruction is changed to the form (b,p,c).

Alternatively, the obstruction is now the obligation of the receiving process "q" and will take the form (d,p,a), where "q" receives "a" on endpoint "d." Such changes to the obstructions maintain the desired invariant that every possible cycle in the communication graph is covered by at least one obstruction.

Methodological Implementation of Deadlock Freedom Verification

Figure 3:
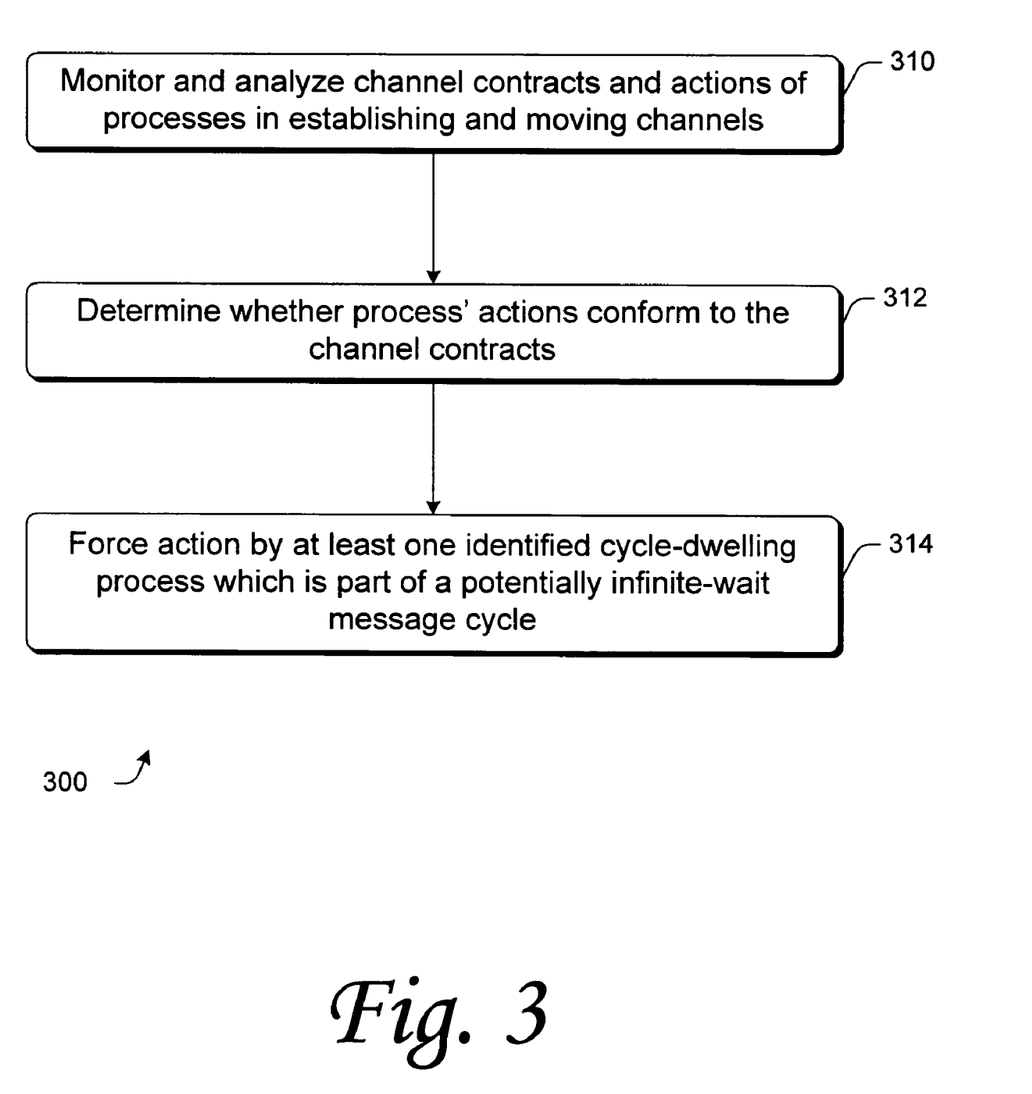
FIG. 3 shows a flow diagram showing a methodological implementation described herein.

FIG. 3 shows a method 300 performed by the deadlock-freedom verifier 124. This methodological implementation may be performed in software, hardware, or a combination thereof. For ease of understanding, the method is delineated as separate steps represented as independent blocks in FIG. 3; however, these separately delineated steps should not be construed as necessarily order dependent in their performance. Additionally, for discussion purposes, the method 300 is described with reference to FIG. 1.

At 310 of FIG. 3, the deadlock-freedom verifier 124 monitors and analyzes channel contracts of all existing channels in the current network of inter-connected processes. The verifier also monitors and analyzes the channel-creation and channel-endpoint-transfer actions of the processes in that network.

At 312, the deadlock-freedom verifier 124 determines whether a channel-creation or channel-endpoint-transfer action of a process (of that network) conforms to the channel contract associated with the channel subject to that action. If so, then this is the first assurance of deadlock freedom. If not, then it either prevents the action from taking place or it flags the action to notify another component of the operating system or the IPC architecture 100.

At 314, the deadlock-freedom verifier forces a cycle-blocking action by at least one identified cycle-dwelling process.

Exemplary Computing System and Environment

Figure 4:
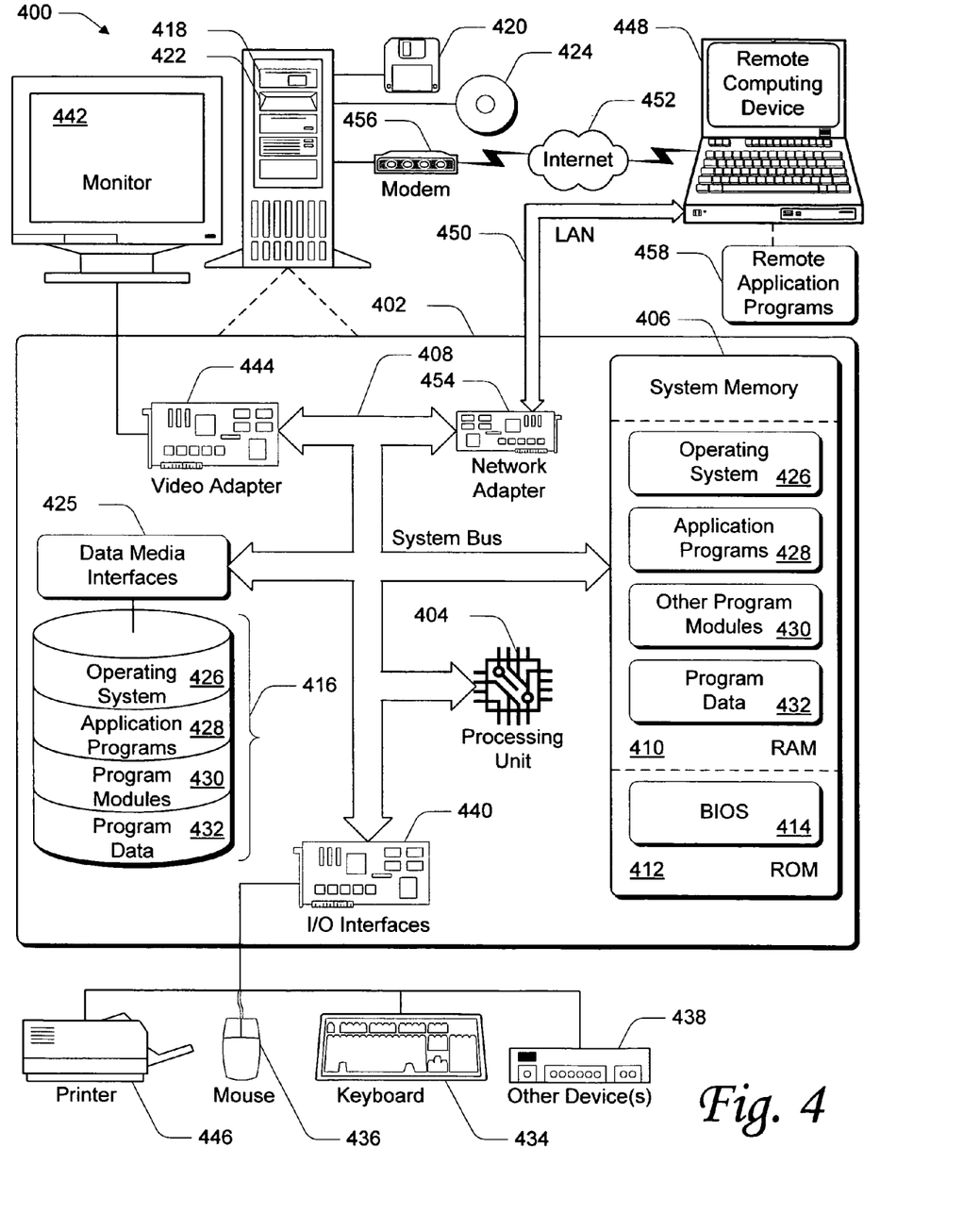
FIG. 4 is an example of a computing operating environment capable of (wholly or partially) implementing at least one embodiment described herein.

FIG. 4 illustrates an example of a suitable computing environment 400 within which an exemplary inter-process communication, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary inter-process communication may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary inter-process communication may be described in the general context of processor-executable instructions, such as program modules, being executed by a computer. Generally, program modules include routines, programs, objects, components, data structures, etc. that perform particular tasks or implement particular abstract data types. The exemplary inter-process communication may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 may include, but are not limited to, one or more processors or processing units 404, a system memory 406, and a system bus 408 that couples various system components, including the processor 404, to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 402 typically includes a variety of processor-readable media. Such media may be any available media that is accessible by computer 402 and includes both volatile and non-volatile media, removable and non-removable media.

The system memory 406 includes processor-readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 may be connected to the system bus 408 by one or more interfaces (not shown).

The disk drives and their associated processor-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 416 magnetic disk 420, optical disk 424, ROM 412, and/or RAM 410, including, by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components, such as speakers (not shown) and a printer 446, which may be connected to computer 402 via the input/output interfaces 440.

Computer 402 may operate in a networked environment using logical connections to one or more remote computers, such as a remote computing device 448. By way of example, the remote computing device 448 may be a personal computer, a portable computer, a server, a router, a network computer, a peer device or other common network node, and the like. The remote computing device 448 is illustrated as a portable computer that may include many or all of the elements and features described herein, relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. Such networking environments may be wired or wireless.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted, relative to the computer 402 or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computing device 402, and are executed by the data processor(s) of the computer.

Processor-Executable Instructions

An implementation of an exemplary inter-process communication may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 400 in which an exemplary inter-process communication may be implemented. Specifically, the exemplary inter-process communication(s) described herein may be implemented (wholly or in part) by any program modules 428-430 and/or operating system 426 in FIG. 4 or a portion thereof.

The operating environment is only an example of a suitable operating environment and is not intended to suggest any limitation as to the scope or use of functionality of the exemplary inter-process communication(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary inter-process communication may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

CONCLUSION

The techniques, described herein, may be implemented in many ways, including (but not limited to) program modules, general- and special-purpose computing systems, network servers and equipment, dedicated electronics and hardware, and as part of one or more computer networks. The techniques, described herein, may be implemented, for example, on a computer system depicted in FIG. 4. More particularly, these techniques may be implemented, for example, by an operating system on a computer system depicted in FIG. 4.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more computer storage media having processor-executable instructions that, when executed by a computing device having a processor and memory communicatively coupled to the processor, configure the computing device to perform acts comprising:

facilitating establishment of a bi-directional message conduit having exactly two endpoints, a first endpoint being directly connected to and owned by a first software process and a second endpoint being directly connected to and owned by a second software process, the first software process and the second software process being located within the memory of the computing device and executed within an operating system of the computing device; and maintaining the bi-directional message conduit for passing multiple messages via the bi-directional message conduit only between the first software process and the second software process, wherein:

the passing consists of passing the multiple messages only from one endpoint of the bi-directional message conduit to another endpoint of the bi-directional message conduit; and the passing of multiple messages via the bi-directional message conduit is constrained by a processor-readable contract having information that defines a relationship between the first and second software processes with regard to the bi-directional message conduit, the information comprising:

a set of message types that are allowed to be sent through the bi-directional message conduit;

a description of allowable sequences of message exchange between the two endpoints of the bi-directional message conduit; and an allowed ordering of messages to be sent between the two endpoints of the bi-directional message conduit.

2. One or more computer storage media as recited in claim 1, wherein the acts further comprise:
    facilitating establishment of a set of multiple additional bi-directional message conduits linking a network of software processes, each of the conduits of the set having exactly two endpoints with each endpoint being owned by, at most, one software process, wherein each of message conduits of the set is configured to only connect one of the software processes that owns one endpoint and another one of the software processes that owns another one endpoint; and
    maintaining the set of multiple additional bi-directional message conduits for passing multiple messages from one of the software processes in the network to another software process in the network, wherein the multiple message messages are sent via multiple conduits of the set.

3. One or more computer storage media as recited in claim 1 further comprising:
    facilitating establishment of a set of multiple additional bi-directional message conduits linking a network of software processes, each of the conduits of the set having exactly two endpoints with each endpoint being owned by, at most, one software process;
    maintaining the set of multiple additional bi-directional message conduits for passing multiple messages from one of the software processes in the network to another software process in the network, wherein the multiple message messages are sent via multiple conduits of the set;
    facilitating passing a message via the set of multiple additional bi-directional message conduits linking a network of software processes, wherein the message comprises an endpoint of a bi-directional message conduit.

4. One or more computer storage media as recited in claim 1 further comprising maintaining the bi-directional message conduit for passing one or more messages from the first software process to the second software process, the one or more messages containing a transfer of ownership of an endpoint of a bi-directional message conduit.

5. One or more computer storage media as recited in claim 1 further comprising maintaining the bi-directional message conduit for passing one or more messages from the first software process to the second software process, the one or more messages containing a transfer of ownership of an endpoint of a bi-directional message conduit and statically defining the state of the transferred endpoint within a processor-readable contract.

6. One or more computer storage media as recited in claim 1, wherein ownership of an endpoint of the bi-directional message conduit designates that an owning software process has a right to send or receive messages via the bi-directional message conduit.

7. One or more computer storage media as recited in claim 1, wherein ownership of an endpoint of the bi-directional message conduit designates that an owning software process has a right to send or receive messages via the bi-directional message conduit and the first endpoint owns a first endpoint of the bi-directional message conduit and its ownership is fixed, so that the ownership of the first endpoint is not transferable from the first software process.

8. One or more computer storage media as recited in claim 1, wherein the acts further comprise facilitating a request by the first software process for precise identification of the process that owns the other endpoint of the bi-directional message conduit.

9. One or more computer storage media as recited in claim 1, wherein ownership of an endpoint of the bi-directional message conduit designates that an owning software process has a right to send or receive messages via the bi-directional message conduit, the acts further comprising facilitating a request by the first software process to fix ownership to one endpoint the bi-directional message conduit, so that ownership of the fixed endpoint is not transferable to another software process.

10. One or more computer storage media as recited in claim 1, wherein ownership of an endpoint of the bi-directional message conduit designates that an owning software process has a right to send or receive messages via the bi-directional message conduit and the second software process owns the second endpoint of the bi-directional message conduit, the acts further comprising facilitating a request by the second software process for identification of an owner of a first endpoint of the bi-directional message conduit.

11. One or more computer storage media as recited in claim 1, wherein ownership of an endpoint of the bi-directional message conduit designates that an owning software process has a right to send or receive messages via the bi-directional message conduit and the second software process owns the second endpoint of the bi-directional message conduit, the acts further comprising:
    facilitating a request by the second software process for identification of an owner of a first endpoint of the bi-directional message conduit;
    facilitating a response to the second software process from the owner of the first endpoint of the bi-directional message conduit, wherein such response only identifies the owner of the first endpoint when that owner's ownership of the first endpoint is fixed.

12. One or more computer storage media as recited in claim 1, wherein the acts further comprise exposing primitive operations of a kernel of the operating system for invocation by the first software processes, primitive operations being basic functions of kernel that affect only the state of the invoking process, which is the first software process.

13. One or more computer storage media as recited in claim 1, wherein the second software process is a high-level service of a kernel of the operating system.

14. One or more computer storage media as recited in claim 1, wherein the acts further comprise facilitating a request for creation of the bi-directional message conduit by the first software process, wherein both the first and the second endpoints are owned by the first software process.

15. One or more computer storage media as recited in claim 1, wherein the acts further comprise terminating the first software process if the bi-directional message conduit owned by the first software process becomes unusable and the first software process does not have access to any other usable bi-directional message conduit.

16. One or more computer storage media as recited in claim 1, wherein the multiple messages being passed via the bi-directional message conduit are statically identified by the processor-readable contract.

17. One or more computer storage media as recited in claim 1, wherein the multiple messages being passed via the bi-directional message conduit are passed asynchronously.

18. One or more computer storage media as recited in claim 1, wherein the multiple messages being passed via the bi-directional message conduit are sent in a defined order and are received in the same defined order.

19. One or more computer storage media as recited in claim 1, wherein each of the multiple messages being passed via the bi-directional message conduit is encapsulated so that all data referenced by a message are themselves transferred when the message is passed.

20. One or more computer storage media having processor-executable instructions that, when executed by a computing device having a processor and memory communicatively coupled to the processor, configure the computing device to perform acts comprising:

constructing a first software process for execution within an operating system of the computing device;

facilitating establishment of a bi-directional message conduit having exactly two endpoints, a first endpoint being owned by the first software process and a second endpoint being owned by a service of the operating system, wherein the bi-directional message conduit is configured to only connect the first software process and the service of the operating system;

maintaining the bi-directional message conduit for passing multiple messages via the bi-directional message conduit only between the first software process and the service of the operating system, wherein:

the passing consists of passing the multiple messages only from one endpoint of the bi-directional message conduit to another endpoint of the bi-directional message conduit;

the passing is constrained by a processor-readable contract having information that defines a relationship between the first software process and the service of the operating system with regard to the bi-directional message conduit, the information comprising:

set of message types that are allowed to be sent through the bi-directional message conduit;

description of allowable sequences of message exchange between the two endpoints of the bi-directional message conduit; and an allowed ordering of messages to be sent between the two endpoints of the bi-directional message conduit.

21. A method comprising:

facilitating establishment of a bi-directional message conduit configured to connect a first software process and a second software process and pass messages to and from the first software process from and to the second software process, the first software process and the second software process being executed within an operating system of the computing device and located within the memory of the computing device; and maintaining the bi-directional message conduit for passing multiple messages via the bi-directional message conduit from the first software process to the second software process, wherein:

the passing consists of passing the multiple messages only between the first software process and the second software process to which the bi-directional message conduit is connected; and the passing is constrained by a processor-readable contract having information that defines a relationship between the first and second software processes with regard to the bi-directional message conduit, the information comprising:

a set of message types that are allowed to be sent through the bi-directional message conduit;

a description of allowable sequences of message exchange between two endpoints of the bi-directional message conduit; and an allowed ordering of messages to be sent between the two endpoints of the bi-directional message conduit.

22. The method as recited in claim 21, wherein the bi-directional message conduit has exactly two endpoints, each endpoint being owned by, at most, one software process.

23. The method as recited in claim 21, wherein the bi-directional message conduit has exactly two endpoints, a first endpoint being owned by the first software process and a second endpoint being owned by the second software process.

24. The method as recited in claim 21, wherein the second software process is a service of a kernel of an operating system.

25. A computing device comprising:

one or more processors;

memory communicatively coupled to the one or more processors, the memory having stored thereon instructions that, when executed at the computing device, configure the computing device to perform acts comprising:

facilitating establishment of a bi-directional message conduit configured to connect a first software process and a second software process and pass messages to and from the first software process from and to the second software process, the first software process and the second software process being executed within an operating system of the computing device and located within the memory of the computing device; and maintaining the bi-directional message conduit for passing multiple messages via the bi-directional message conduit between the first software process and the second software process wherein:

the passing consists of passing the multiple messages only between the first software process and the second software process to which the bi-directional message conduit is connected; and the passing is constrained by a processor-readable contract having information that defines a relationship between the first and second software processes with regard to the bi-directional message conduit, the information comprising:

a set of message types that are allowed to be sent through the bi-directional message conduit;

a description of allowable sequences of message exchange between two endpoints of the bi-directional message conduit; and an allowed ordering of messages to be sent between the two endpoints of the bi-directional message conduit.

26. The computing device as recited in claim 25, wherein the bi-directional message conduit has exactly two endpoints, each endpoint being owned by, at most, one software process.

27. The computing device as recited in claim 25, wherein the bi-directional message conduit has exactly two endpoints, a first endpoint being owned by the first software process and a second endpoint being owned by the second software process.

28. The computing device as recited in claim 25, wherein the acts further comprise maintaining the bi-directional message conduit for passing one or more messages from the first software process to the second software process, the one or more messages containing a transfer of ownership of an endpoint of a bi-directional message conduit.

29. The computing device as recited in claim 25, wherein the acts further comprise maintaining the bi-directional message conduit for passing one or more messages from the first software process to the second software process, the one or more messages containing a transfer of ownership of an endpoint of a bi-directional message conduit and containing information describing a current state of computation within the first software process.

30. The computing device as recited in claim 25, wherein the acts further comprise facilitating a request by a first software process for precise identification of the process that owns the other endpoint of the bi-directional message conduit.

31. The computing device as recited in claim 25, wherein the acts further comprise exposing primitive operations of a kernel of an operating system for invocation by the first software processes, primitive operations being basic functions of kernel that affect only the state of the invoking process, which is the first software process.

32. The computing device as recited in claim 25, wherein the second software process is a high-level service of a kernel of an operating system.

33. The computing device as recited in claim 25, wherein the acts further comprise facilitating a request for creation of the bi-directional message conduit by the first software process, wherein both the first and the second endpoints are owned by the first software process.

34. The computing device as recited in claim 25, wherein the acts further comprise terminating the first software process if the bi-directional message conduit when the first software process becomes unusable and the first software process does not have access to any other usable bi-directional message conduit.

35. The computing device as recited in claim 25, wherein the multiple messages being passed via the bi-directional message conduit are statically identified within the processor-readable contract.

36. The computing device as recited in claim 25, wherein the multiple messages being passed via the bi-directional message conduit are passed asynchronously.

37. The computing device as recited in claim 25, wherein the multiple messages being passed via the bi-directional message conduit are sent in a defined order and are received in the same defined order.

38. The computing device as recited in claim 25, wherein each of the multiple messages being passed via the bi-directional message conduit is encapsulated so that all data referenced by a message are themselves transferred when the message is passed.

39. A method of facilitating establishment of inter-process communication between a first software process and a second software process executed within an operating system of a computing device, the method being implemented at the computing device and comprising:
  facilitating a request by the first software process for creation of a bi-directional message conduit, the facilitating act comprising creating the requested bi-directional message conduit having exactly two endpoints which are both owned by the first software process, the first software process and the second software process being executed within the operating system of the computing device and located within the memory of the computing device; and
  facilitating, at the computing device, establishment of inter-process communication between the first software process and the second software process by passing one or more messages from the first software process to the second software process, wherein:
    one or more passed messages contains a transfer of ownership of one of the endpoints of the bi-directional message conduit; and
    the passing is constrained by a processor-readable contract having information that defines a relationship between the first software process and the second software processes with regard to the bi-directional message conduit, the information comprising:
      a set of message types that are allowed to be sent through the bi-directional message conduit;
      a description of allowable sequences of message exchange between the two endpoints of the bi-directional message conduit; and
      an allowed ordering of messages to be sent between the two endpoints of the bi-directional message conduit.

40. A method of facilitating establishment of inter-process communication between a first software process and a second software process executed within an operating system of a computing device, the method being implemented at the computing device and comprising:
  providing, at the computing device, communication mechanisms for software processes to communicate with each other by message exchange, the providing act comprising:
    facilitating establishment of a bi-directional message conduit having exactly two endpoints, each endpoint being owned by, at most, one software process, the bi-directional message conduit directly connecting the software processes owning the two endpoints of the bi-directional message conduit; and
    maintaining the bi-directional message conduit for passing multiple messages via the bi-directional message conduit between the software processes that are connected by the bi-directional message conduit, wherein the passing is constrained by a processor-readable contract having information that defines a relationship between the software processes with regard to the bi-directional message conduit, wherein the information comprises:
      a set of message types that are allowed to be sent through the bi-directional message conduit;
      a description of allowable sequences of message exchange between the two endpoints of the bi-directional message conduit; and
      an allowed ordering of messages to be sent between the two endpoints of the bi-directional message conduit; and
  exposing primitive operations of a kernel of an operating system for invocation by one or more software process, a primitive operation being a basic function of kernel that affects only the state of an invoking process that invoke the primitive operation.

* * * * *